Sept. 15, 1959  J. STEC  2,904,371
COMBINED SUN VISOR, WORK SUPPORT AND WORK CONTAINER
Filed Oct. 11, 1955
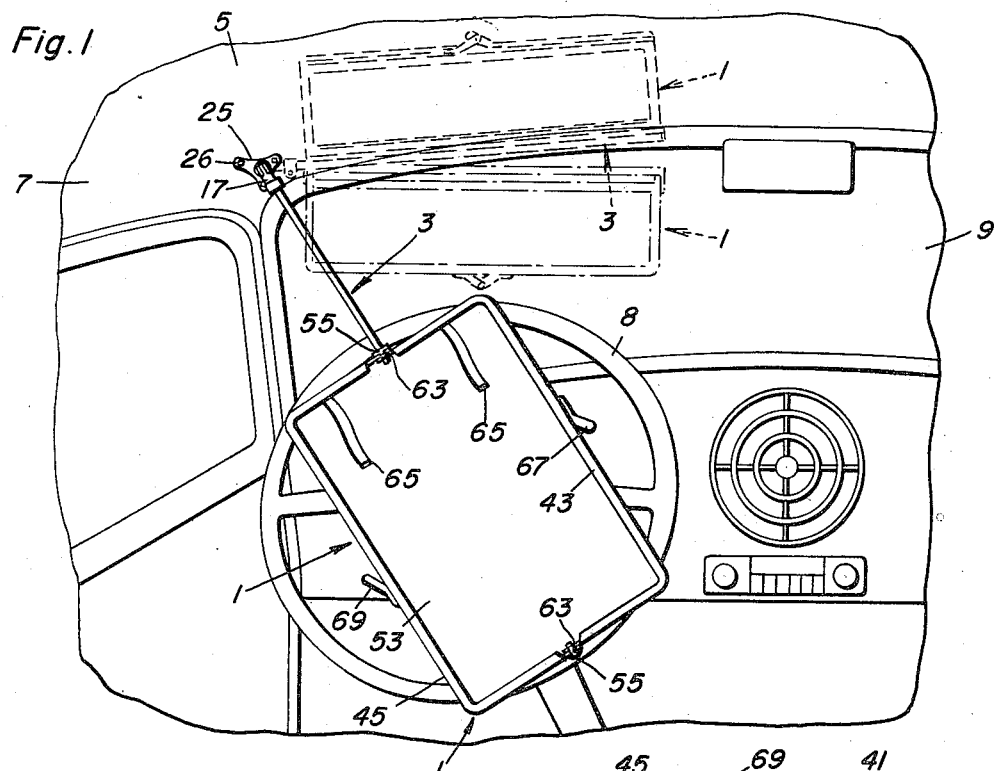
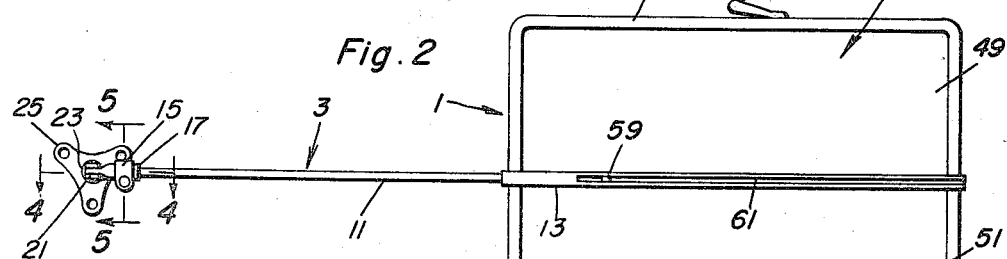
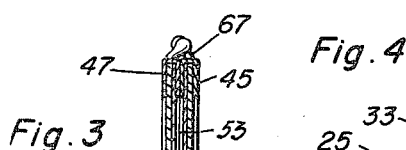
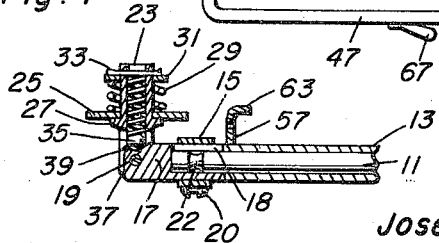
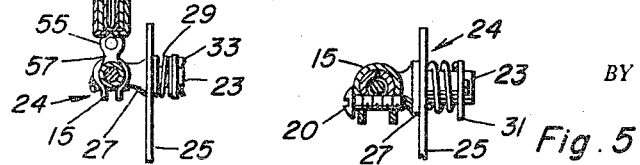
Joseph Stec
INVENTOR.

United States Patent Office 2,904,371
Patented Sept. 15, 1959

2,904,371

COMBINED SUN VISOR, WORK SUPPORT AND WORK CONTAINER

Joseph Stec, Ranfurly, Alberta, Canada

Application October 11, 1955, Serial No. 539,903

1 Claim. (Cl. 296—97)

My invention relates to a combined sun visor, work support, and work container device for automobiles.

The primary object of my invention is to provide a sectional member, or unit, convertible for use as a sun visor, work support, or work container, together with means attaching the same in an automobile body for swinging into a position of rest on the steering wheel of the automobile when it is used as a work support, or for swinging either into a position alongside the automobile windshield for use as a sun visor, or above said windshield in an out-of-the-way position when used as a work container.

Another object is to provide for mounting the convertible member on an arm which is swingably and rotatably mounted to facilitate positioning of said member.

Still another object of the invention is to provide friction locking means for retaining said arm in differently swung and rotated positions.

Yet another object is to provide a device adapted for the above purposes which is easy to operate, not liable to get out of order, and is especially adapted for quick, easy attachment in any closed automobile body.

Other, ancillary objects, together with the precise nature of my invention, together with the advantages thereof will become readily apparent when the following description and claim are read with reference to the accompanying drawing in which:

Figure 1 is a fragmentary view in perspective illustrating my invention attached in an automobile body and shown in its different positions in full and broken lines;

Figure 2 is an enlarged bottom plan view of the device detached;

Figure 3 is an enlarged view in transverse section with the member converted for use as a sun visor and also as a work container;

Figure 4 is an enlarged fragmentary view in horizontal section taken on the line 4—4 of Figure 2; and, Figure 5 is an enlarged fragmentary view in transverse section taken on the line 5—5 of Figure 2.

Referring to the drawing by numerals, according to my invention, a combined sun visor, work support and work container member, designated generally by the numeral 1, is carried on the free end of an extensible and contractible arm, designated generally by the numeral 3, and which is attachable at its other end, by means presently described, in the upper front lefthand corner 5 of an automobile body 7 for swinging into a downwardly and rearwardly inclined position to rest said member on the steering wheel 8 for use as a work support, or for swinging upwardly and forwardly to position the member 1 alongside the windshield 9 for use of the member as a sun visor, or work container.

The arm 3 comprises a rod section 11 and a tubular sleeve section 13 slidably adjustable along said rod section 11 to extend or contract the arm 3. The rod section 11 at an attached end of the arm 3 is rotatable in a tubular joint section 17 pivoted at one end by a transverse pin 19 in the bifurcated end 21 of a substantially horizontal tubular joint section 23 rotatable in a triangular bearing plate 25 bolted, as at 26, to the roof of the body 7 in said corner 5 with suitable spacers, not shown, behind said plate. As will be seen, the sections 17, 23 form an articulated swivel joint 24 by means of which the arm 3 is swingable and rotatable for positioning as specified. The rod section 11, and hence the arm 3 is frictionally locked in different rotated positions by a C-clamp 15 on the joint section 17 which is split as at 18, the C-clamp having a screw 20 therein engaging a circumferential groove 22 in the rod section 11 to retain said rod section in the joint section 17.

Means is provided for frictionally locking the joint section 23 and arm 3 in rotated position comprising a collar 27 on said section in front of the bearing plate 25 engaged with said plate by a coil spring 29 on said section 23 behind said plate and held on said section by a washer 31 and a cotter pin 33 in said section.

The arm 3 is yieldingly locked in its differently swung positions by means of a spring loaded ball 35 in the joint section 23 engaging a flattened grooved end 37 on the joint section 17 in the downwardly and rearwardly swung position of the arm 3, said ball engaging a notch 39 in said section in the upwardly swung horizontal position of said arm to lock said arm in upwardly swung position.

The combined sun visor, work support and work container member 1 comprises a pair of opposite side panel sections 41, 43 each formed by a pair of rectangular marginal frames 45, 47 of internally channeled form crimped around the marginal edges of a pair of similarly shaped panels 49, 51, and also crimped to opposite longitudinal edges of an oblong rectangular facing sheet 53 of flexible material loose between said longitudinal edges thereof and adapted to cover said panels 49, 51 in the work supporting position of said member 1.

The panel sections 41, 43 are hinged together at ends thereof in opposite relation and pivotally connected together, as at 55, and to a pair of lateral end lugs 57 on the sleeve section 13 whereby the sections 41, 43 are swingable into coplanar butt joint relation with the facing sheet 53 uppermost when said member 1 is in work supporting position, and whereby said sections 41, 43 are foldable into facing relation for use as a sun visor, or work container. It will be noted that when the sections 41, 43 are folded, the sheet 53, as shown in Figure 3, is folded at its center to form with said sections a container adapted to hold sheets of writing paper or other papers, or articles therein.

The sleeve section 13 is splined to the rod section 11 by a lug 59 on the rod section 11 working in a longitudinal groove 61 in the sleeve section 13, and lateral fingers 63 are provided on the lugs 57 which are interposed between the frames 45, 47 when the sections 41, 43 are folded. This provides means for rotating the rod section 11, and hence the arm 3, by swinging of the sun visor, work support and work container member 1 about the axis of said arm 3, for a purpose presently seen.

Resilient work holding fingers 65 are provided on the frames 45, 47 for holding a work sheet or the like to the panels 41, 43, and a pair of resilient snap action clasps 67, 69 are also provided on the frames 45, 47 for locking said sections 41, 43 folded and a container formed by the panels 41, 43 and the sheet 53 closed.

The operation of my device will be readily understood. By manipulating the combined sunvisor, work support and work container member 1, the arm 3 may be swung downwardly and rearwardly and extended, or contracted, by sliding of the sleeve section 13 on the rod section 11 until the sleeve section 13 at the free end of the arm 3 rests on the steering wheel 8; the arm 3 may then be rotated in the manner previously described, by tilting said member 1 and the sections 41, 43 of said member 1 swung into open coplanar relation for use of said member as a work support overlying the steering wheel 8, all as shown in Figure 1 in full lines for supporting writing paper sheets, reading matter or the like held to the sections 41, 43 on top of the work sheet 53 by the fingers 65.

For use of the device as a sun visor, the sections 41, 43 are folded into face-to-face closed relation, said member 1 and arm 3 are swung upwardly and forwardly into substantially horizontal position alongside the windshield 9, and the folded or closed member 1 is then preferably rotated to depend from said arm 3 behind the windshield 9 as shown in dot and dash lines in Figure 1. Of course, the arm 3 may be extended or contracted to position said member along the arm to facilitate use of the member 1 as a sun visor.

When it is desired to use the device as a work container, the folded sections 41, 43 of the member 1 with writing paper or the like interposed therebetween may be rotated together with the arm 3 to position said sections and hence the member 1 above the arm 3 to extend upwardly above the arm 3 above the windshield in an out-of-the-way position with the arm extended or contracted as desired, all as shown in dash lines in Figure 1. Optionally the member 1 and the arm 3 may be swung downwardly from this position to position the member for use as a sun visor.

The foregoing, it is believed, suffice to impart a clear understanding of my invention, without further explanation.

Manifestly, the invention is susceptible of modification without departing from the inventive concept and right is herein reserved to such modifications as fall within the scope of the appended claim.

What is claimed as new is as follows:

A device for use in an automobile comprising an arm, joint means on one end of said arm attachable to the top of an automobile and on which said arm is swingable to incline downwardly and rearwardly over an automobile steering wheel to rest thereon, or upwardly and forwardly alongside an automobile windshield, a pair of terminally pivoted together U-shaped channel frames foldable into side-by-side relation and unfoldable into coplanar relation, a pair of rigid panels fitted and secured in the channels of said frames for folding side by side by said frames for use as a sun visor and unfoldable by said frames into coplanar relation to form a work sheet support, a flexible covering sheet for said panels having edges secured in said channels and being loose between said edges and foldable upon itself to form a work sheet containing pocket suspended from said frames between said panels in response to folding of said panels for use as a sun visor, and snap action clasps on said frames for maintaining said frames, panels, and covering sheet folded, and means for mounting said frames on the other end of said arm with the pivotal axis of said frames parallel with said rod for functioning of said panels and covering sheet as a sheet support adapted to overlie an automobile steering wheel when said arm is swung over a steering wheel and as a sun visor and container when said arm is swung upwardly and forwardly.

References Cited in the file of this patent

UNITED STATES PATENTS

| | | |
|---|---|---|
| 942,670 | Sauerwein et al. | Dec. 7, 1909 |
| 1,464,021 | Battle | Aug. 7, 1923 |
| 1,546,739 | LeLande | July 21, 1925 |
| 1,574,428 | Komorous | Feb. 23, 1926 |
| 1,701,696 | Parsons | Feb. 12, 1929 |
| 2,077,736 | Bowerman | Apr. 20, 1937 |
| 2,257,612 | Lininger | Sept. 30, 1941 |

FOREIGN PATENTS

| | | |
|---|---|---|
| 105,155 | Australia | Sept. 29, 1938 |
| 665,300 | France | May 6, 1929 |